United States Patent
Homeijer

(10) Patent No.: US 8,984,942 B2
(45) Date of Patent: Mar. 24, 2015

(54) SUSPENDED MASSES IN MICRO-MECHANICAL DEVICES

(75) Inventor: Brian D. Homeijer, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 13/370,555

(22) Filed: Feb. 10, 2012

(65) Prior Publication Data
US 2013/0205901 A1 Aug. 15, 2013

(51) Int. Cl.
*G01P 15/12* (2006.01)

(52) U.S. Cl.
USPC ........................................................ 73/514.33

(58) Field of Classification Search
CPC .................................................... G01P 15/125
USPC ........................................................ 73/514.33
See application file for complete search history.

(56) References Cited

U.S. PATENT DOCUMENTS

| | | | | |
|---|---|---|---|---|
| 4,882,933 | A * | 11/1989 | Petersen et al. | 73/514.13 |
| 5,233,213 | A * | 8/1993 | Marek | 257/415 |
| 5,295,386 | A * | 3/1994 | Okada | 73/1.07 |
| 5,485,749 | A * | 1/1996 | Nohara et al. | 73/514.33 |
| 6,756,247 | B1 | 6/2004 | Davis et al. | |
| 6,920,788 | B2 * | 7/2005 | Okada | 73/514.38 |
| 7,318,349 | B2 | 1/2008 | Vaganov et al. | |
| 7,367,232 | B2 * | 5/2008 | Vaganov et al. | 73/514.33 |
| 7,745,235 | B2 * | 6/2010 | Kimino | 438/11 |
| 7,757,393 | B2 * | 7/2010 | Ayazi et al. | 29/847 |
| 2002/0125208 | A1 | 9/2002 | Christenson et al. | |
| 2002/0160611 | A1 * | 10/2002 | Horsley | 438/694 |
| 2004/0200281 | A1 * | 10/2004 | Kenny et al. | 73/514.33 |
| 2005/0081633 | A1 * | 4/2005 | Nasiri et al. | 73/514.29 |
| 2005/0183503 | A1 * | 8/2005 | Malametz | 73/514.01 |
| 2007/0012653 | A1 * | 1/2007 | Nasiri et al. | 216/2 |

* cited by examiner

*Primary Examiner* — Hezron E. Williams
*Assistant Examiner* — Mark A Shabman
(74) *Attorney, Agent, or Firm* — Van Cott, Bagley, Cornwall & McCarthy

(57) ABSTRACT

The micro-mechanical device includes a substrate with an internal cavity, a first surface, and an opposing second surface. A first trench is formed from the first surface of the substrate into the internal cavity. The first trench at least partially defines flexures. A second trench is formed from the second surface of the substrate into the internal cavity and at least partially defines a suspended mass. The suspended mass is connected by the flexures to the substrate.

15 Claims, 6 Drawing Sheets

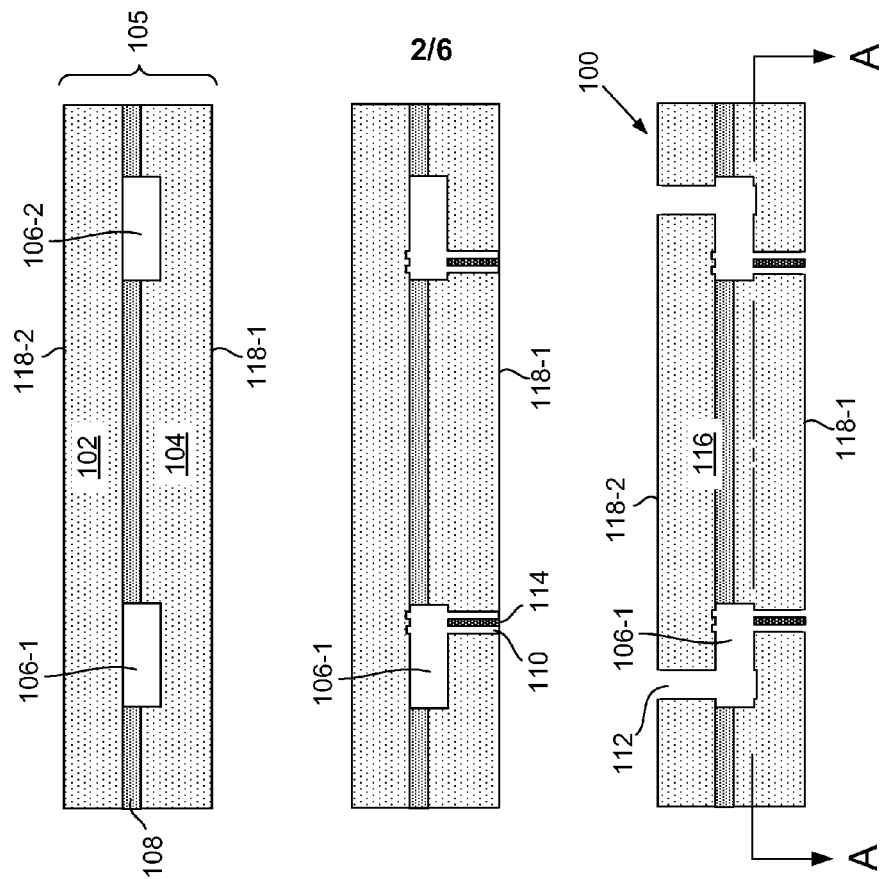

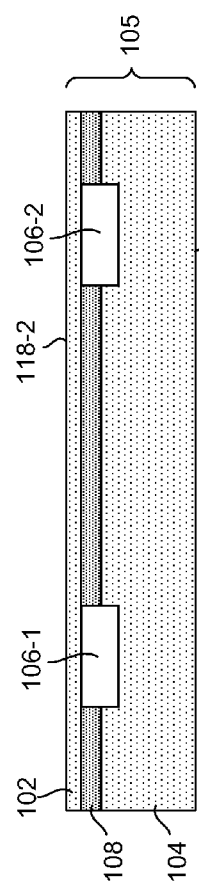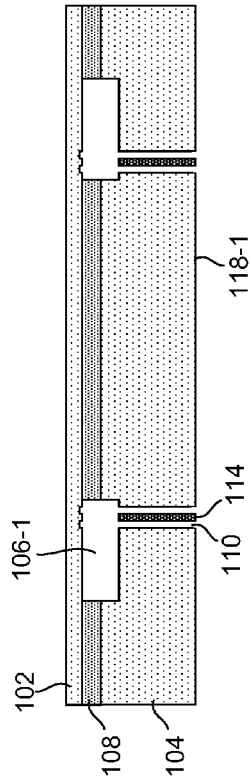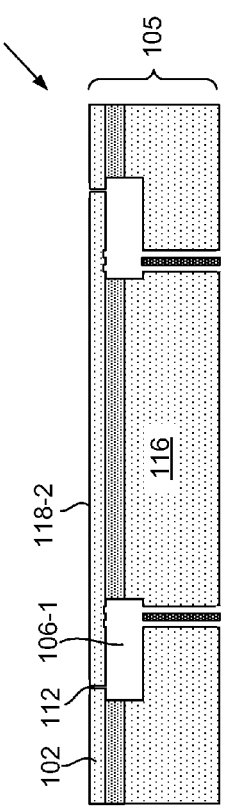

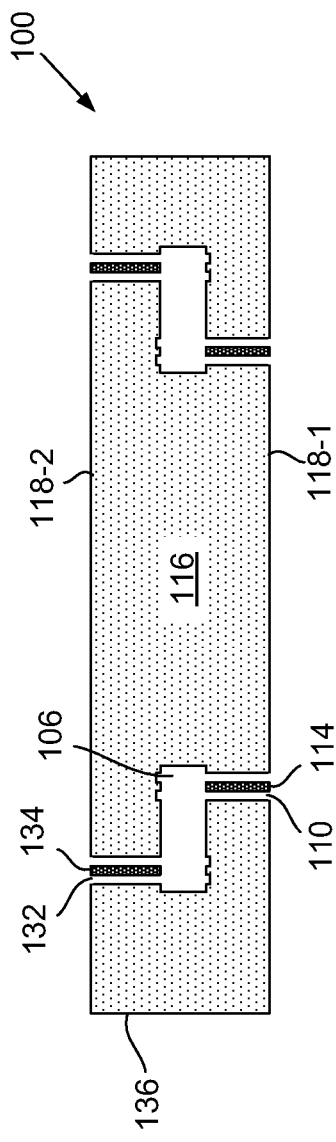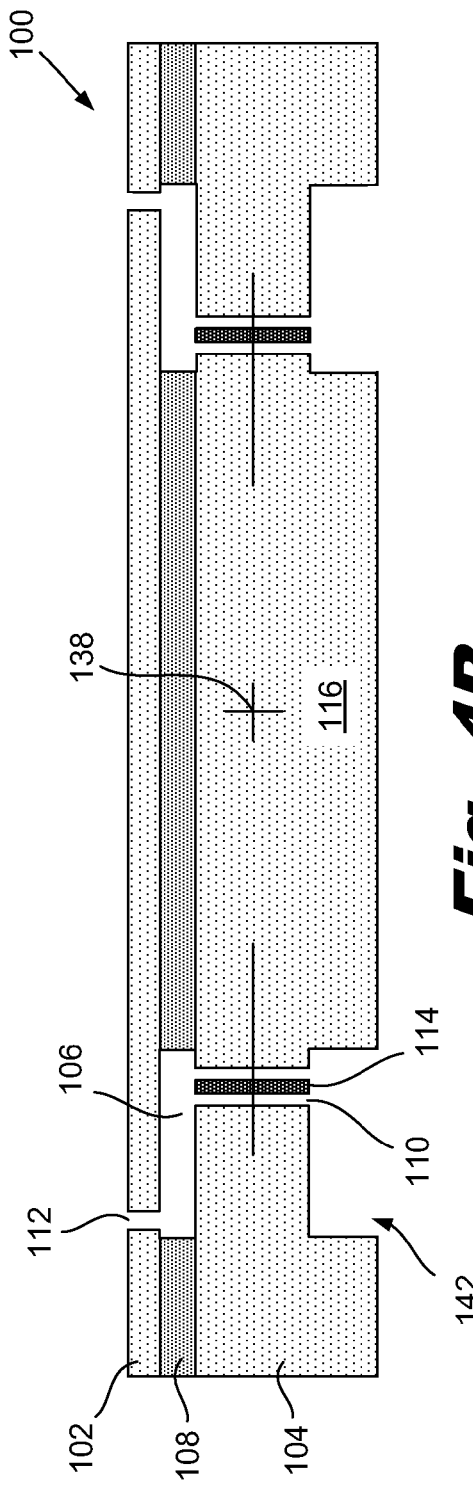

SUSPENDED MASSES IN MICRO-MECHANICAL DEVICES

BACKGROUND

Micro-mechanical devices have length scales between 1 to 1000 micrometers. Micro-mechanical devices can be used in a variety of applications including actuators and sensors. For example, micro-mechanical devices with suspended masses can be used as sensors in accelerometers, gyroscopes, resonators, microphones and pressure sensors and as actuators in optical displays, projectors, and other devices.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 2A and 2B are a flow chart and cross sectional diagrams, respectively, of a method for forming a micro-mechanical device with a suspended mass, according to one example of principles described herein.

FIG. 3A-3C are cross sectional diagrams of a micro-mechanical device with suspended mass, according to one example of principles described herein.

FIG. 4A is a diagram of a micro-mechanical device with upper and lower flexures, according to one example of principles described herein.

FIG. 4B is a diagram of a micro-mechanical device with centered flexures, according to one example of principles described herein.

Throughout the drawings, identical reference numbers designate similar, but not necessarily identical, elements.

DETAILED DESCRIPTION

Micro-mechanical devices with suspended masses may be used in accelerometers, gyroscopes, resonators, microphones, pressure sensors, optical displays, and other devices. The suspended masses are connected to a substrate by flexures. A suspended mass can be actuated to redirect light or motion of the mass can be used to sense acceleration or pressure.

Micro-mechanical accelerometers can be used to measure acceleration in at least one direction and to measure accelerations of 1000 times the force of gravity or more. Systems designed to measure high accelerations will typically use a small mass and relatively stiff flexures. In contrast, systems designed to measure low accelerations will use larger masses and more flexible flexures. One challenging application is to design micromechanical systems that are sensitive enough to measure very small changes in the local gravitational field or changes in the orientation of the device. The accelerometers in these applications are typically very sensitive and may include integral vibration isolation and signal processing. Ideally, they would also be robust enough to withstand high accelerations produced by handling, accidents, impacts, and other events.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

Designing micro-mechanical devices with suspended masses includes a variety of challenges. The devices include at least one flexure that connects the suspended mass to the bulk of the substrate. The size and cross sectional dimensions of the flexures can significantly influence the performance of the micro-mechanical devices. One challenge in maintaining the desired dimensions of the flexures is that subsequent processes, such as release etching, can undesirably alter the flexures and change the performance of the device. For example, etching techniques may include reactive ion etching, deep reactive ion etching (the "Bosch process"), photolithography, laser etching or other techniques.

Figure 1:
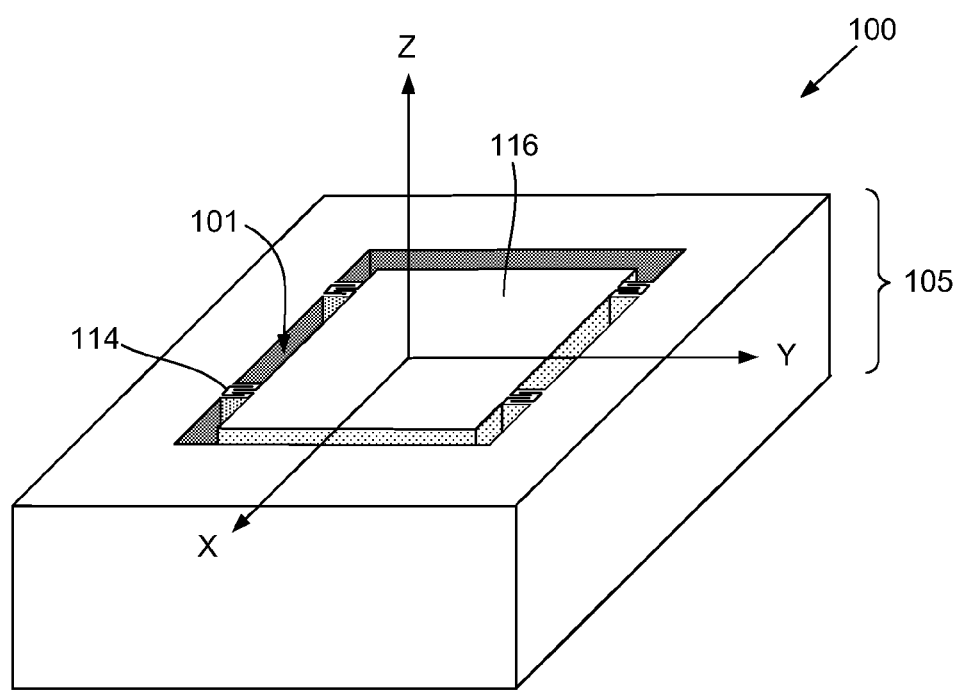
FIG. 1 is a perspective view of a micro-mechanical device that includes a suspended mass, according to one example of principles described herein.

FIG. 1 is a perspective view of a micro-mechanical sensor (100) that includes a substrate (105) and a suspended mass (116). The suspended mass (116) has been cut out of the substrate (105) by a trench (101) and is connected to the substrate by flexures (114). In this example, the flexures (114) are formed directly from the substrate (105) using narrow trenches. In this case, four flexures (114) are illustrated, but there may be any suitable number of flexures depending on the design parameters. A number of additional components may be present in the micro-mechanical sensor (100) but are not illustrated. For example, a variety of electrical components may be included, such capacitive plates, signal conditioning electronics, and other devices can be used to convert relative differences in motion between the suspended mass (116) and the substrate (105) into electrical signals. The terms "suspended mass," "proof mass," and "mass" are used interchangeably to denote a body (116) that is suspended from a surrounding substrate (105) by flexures.

As described above, a micro-mechanical sensor (100) can be used in a variety of ways, including sensing acceleration (such as changes in velocity and the acceleration of gravity). FIG. 1 shows three orthogonal axes, with the X axis and Y axis defining a plane that is parallel to the plane of the substrate. The Z axis is perpendicular to the plane of the substrate.

A micro-mechanical accelerometer can be formed to sense acceleration in any of the X, Y, and Z axes or combinations thereof. For example, a micro-mechanical accelerometer can be designed to sense accelerations in only one direction, in two directions, or in all three directions. The shape, size, and locations of the flexures can be selected to that they are relatively flexible in the sensed directions and much stiffer in directions that are not sensed. When accelerations are applied to the device in sensed directions, the mass will move more easily than in other directions.

As discussed above, the precision that the flexures are formed determines their cross sectional shape and stiffness. One challenge in maintaining the desired dimensions of the flexures is that subsequent processes, such as a release etch, can undesirably alter the flexures and change the performance of the device. Another challenge is that process constraints place limits on the depth of the trenches. For example, processes such as wet etching, reactive ion etching (RIE), and deep reactive ion etching (DRIE) can be used. Narrow trenches, such as those used to make flexures, have depth limits that depend on the etching process. These depth limits can restrict the overall thickness of the substrate and the overall inertial mass of a suspended mass of a given size. Additionally, deep and narrow trenches can take significantly longer to etch than wider shallower trenches. Thus, the cost of etching sensors that include deeper and narrower trenches can be significant. The figures and discussion below discuss various principles that can be applied to form the micro-mechanical sensor (100) illustrated in FIG. 1.

FIGS. 2A and 2B are a flow chart and cross sectional diagrams, respectively, of a method for forming the micro-mechanical sensor (100) with a suspended mass (116). In this example, a substrate (105) is obtained that includes with a first surface (118-1), an opposing second surface (118-2), and at least one cavity (106) (block 120).

Silicon is often used to create micro-mechanical systems. Because silicon is used to create integrated circuits, economies of scale provide high quality silicon at relatively low prices. Additionally, silicon has a number of attractive material properties, including minimal mechanical hysteresis and long service lifetimes. The substrate (105) may be a silicon-on-insulator (SOI) substrate with integral cavities. The term silicon-on-insulator refers to the use of a layered silicon-insulator-silicon substrate. The SOI substrate includes a handle layer (104) that is typically multi-crystalline silicon. An insulating silicon oxide layer (108) coats the exterior of the handle layer (104). The silicon oxide layer (108) can be formed in a variety of ways including oxygen ion implantation followed by a high temperature anneal or through directly bonding of an oxidized silicon layer.

A number of cavities (106) are etched through the oxide layer (108) and into the bulk of the silicon handle layer (104). For example, after an oxide layer (108) has been formed on the handle layer (104), a deep reactive ion etching or other suitable process can be used to create the cavities (106). A device layer (102) is bonded over the handle layer (104) and encloses the cavities (106).

A first trench (110) is etched through the first surface (118-1) of the substrate into a first portion of the cavity (106). The first trench (110) defines at least a portion of a first flexure (114) (block 125). Because the first trench (110) and any other trenches defining the flexure (114) pass from the first surface (118-1) into the cavity (106), the trenches (110) need not be as deep as the thickness of the entire handle layer (104) and can be relatively narrow. As discussed above, the flexures (114) that join the suspended mass (116) to the bulk of the SOI substrate can be used to control and sense motion of the suspended mass (116). In this example, the flexures (114) are sandwiched between the sides of the suspended mass (116) and the surrounding substrate (114).

A second trench (a "release trench") (112) is etched through the second surface (118-2) of the substrate (105) and into a second portion of the cavity (106). In this case, the second trench is a "release trench" that at least partially defines the suspended proof mass (116) such that the proof mass is suspended from the substrate by the flexure(s). The proof mass includes a portion of the first surface (118-1) and a portion of the second surface (118-2) (block 130). In this example, the second trench (112) can be relatively wide.

This illustrative technique provides a number of advantages including etching the flexures first. By etching the flexures first, the proof mass is securely joined to the substrate while the higher precision trenches that define the flexures are formed. Later, the release trenches are used to complete the separation of the mass from the substrate.

In contrast, if the flexures were formed with trenches that passed all the way through the substrate, the trenches would have to be relatively wide and would take much longer to form. Additionally, the mass would be more prone to vibrate as the deep trenches neared the opposite surface. This motion could interfere with the etching accuracy.

The cavities in an SOI substrate are used as starting points for creating flexures and suspended masses. The inclusion of the internal cavity allows the flexure etch to penetrate only part of the way through the substrate to the cavity. This limits the depth of the trenches while allowing thicker proof masses to be created and reducing the overall cost of etching the trenches. An additional etch, such as a release etch, can be performed from the opposite side of the substrate. This isolates the two etches and prevents the release etch from undesirably impacting the flexures.

In some implementations, the position of the flexures can also be designed so that the flexures are symmetric with respect to the center of mass of the suspended mass. This balances the spring forces and can prevent or reduce twisting of the suspended mass during accelerations. FIGS. 4A and 4B show examples of designs where the flexures are more symmetrically arranged with respect to the center of mass of the suspended mass.

FIGS. 3A-3C describe a second structure and method for forming a suspended proof mass from an substrate (105) with internal cavities (106). FIG. 3A shows a SOI substrate (105) that includes a handle layer (104), a buried oxide layer (108), a device layer (102) and internal cavities (106). In this example, the internal cavities (106) are closer to the second surface (118-2) and the handling layer (104) is relatively thick while the device layer (102) is much thinner.

FIG. 3B shows the formation of the flexures by using a deep reactive ion etch (DRIE) to create a number of trenches (110) in the handle layer (104). One of the factors that may limit the thickness of the handling layer (104) is the capability of the flexure etching process and the size of the cavities. In general, the thickness of the handling layer between the bottom of the cavity and its exterior surface should be no greater than the acceptable design depth of the flexure trenches. For example, when using deep reactive-ion etching techniques to form the trenches, trench depths between 2 micrometers to 0.5 millimeters are within the acceptable design space. As discussed above, DRIE processes have a number of advantages including forming deep trenches with nearly vertical sides. The trenches pass through the handle layer (110) and into the internal cavities (106). Without the cavities, the trenches that form the flexures would have to pass through the entire thickness of the SOI substrate. This would limit the thickness of the substrate and mass of the proof mass.

FIG. 3C shows a release etch that forms a release trench (112) in the device layer (102) of the substrate (105). As discussed above, in this implementation the device layer (102) of the substrate is relatively thin. This allows the trench (112) formed by the release etch to be very narrow. The narrow release trench (112) may have a number of advantages including placing displacement limits on the suspended mass (116). When the suspended mass (116) moves due to acceleration, the release trench (112) closes and the proof mass encounters the bulk of the substrate. This limits the travel of the proof mass (116) and may reduce undesirable resonances and increase the response time of the sensor. Further, the narrow release trenches (112) prevent large accelerations from damaging the sensor by limiting the motion of the suspended mass (116) before the flexure trenches close and damage the flexures. This type of design can be useful in measuring low accelerations, such as the acceleration of gravity without the device being damaged by larger accelerations.

The suspended mass (116) can be large and extend through the thickness of the substrate (105). Large proof masses are more sensitive to accelerations. As discussed above, the substrate (and the proof mass) can be thicker than the maximum trench depth of the etching process. This is because trenches are etched from both sides into the cavity. As long as the distance between the etching surface and the internal cavity is the same or smaller than the maximum trench depth, the etching process can form the appropriate flexure or release trenches.

Additionally, the flexures are protected from the release etch that is performed on the opposite of the substrate. This allows more design freedom to make thin flexures with low spring constants. The combination of a large suspended mass and flexures with low spring constants allows the device (100) to sense low accelerations, such as the acceleration of gravity.

The flexures can be designed to provide low spring constants in the directions that accelerations are sensed and higher spring constants in directions that motion of the suspended mass is not desirable. For example, when the micromechanical device is designed to measure accelerations that are in the plane of the substrate, the flexures may have cross sections that are narrow in the plane of the substrate and much thicker in the out-of-plane direction (Z axis direction as shown in FIG. 1). For example, the flexures may have cross sectional aspect ratios between 1:2 and 1:10 or higher. When the flexures have a rectangular cross section, the major axis of the cross section can be perpendicular to the plane of the substrate. This makes the flexures more flexible the in-plane direction(s) and much stiffer in the out-of-plane direction. Thus the mass will tend to move more in response to in-plane accelerations and much less in response to out-of-plane accelerations.

FIG. 4A is a diagram of a micro-mechanical sensor (100) with upper flexures (134) and lower flexures (114). This sensor is formed according to the same principles described above. However, instead of performing a release etch on one side of the device, these trenches (110, 132) are also used to form flexures (114, 134). For example, on the first surface (118-1), trenches (110) formed that cut through the internal cavity (106) and form a first set of flexures (114). A second set of flexure trenches (132) are formed in the second surface (118-2) that cut through the substrate (136) to the internal cavity and form a second set of flexures (134). The suspended mass (116) is then connected to the substrate (136) by the upper and lower sets of flexures (114, 132). The upper and lower flexures may provide more balanced forces during acceleration and reduce out-of-plane motion of the suspended mass (116). This can be particularly desirable when the micro-mechanical sensor (100) is designed to sense acceleration in the plane of the substrate.

Although the previous examples utilize a silicon-on-insulator substrate as the substrate, a wide variety of substrate types and structures can be used. In the example shown in FIG. 4A, the substrate (136) does not include multiple layers and can be formed from a variety of materials.

FIG. 4B is a diagram of a micro-mechanical sensor with centered flexures (114). In this example, one set of flexures (114) are formed that are centered with respect to the center of mass (138) of the suspended mass (116). In this case, a relatively thin internal cavity (106) is formed in the silicon oxide layer of an SOI substrate. Depending on the thickness of the silicon oxide layer the internal cavity (106) could extend into other layers as well. To form the flexures (114), a counter bore etch is performed to form a counter bore (142). The counter bore can be fairly wide and configuration of side walls of the counter bore may not be particularly critical. Consequently, the counter bore etch could be performed using a variety of techniques, including reactive ion etching or wet etching. In the bottom of the counter bore, reactive ion etching can be used to form the flexure trenches (110). This centers the flexures with respect to the center of mass (138) of the suspended mass (116). This minimizes twisting of the suspended mass (116) due to cantilever effects.

Figure 5A:
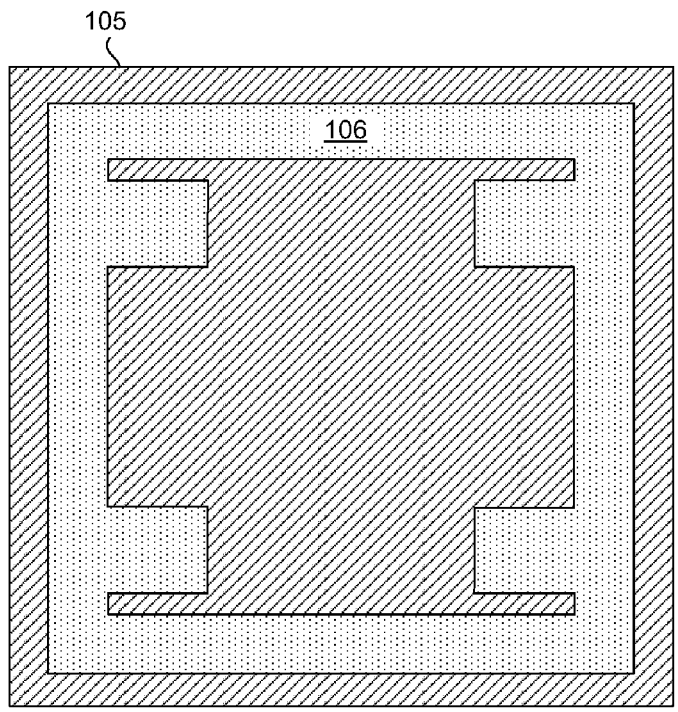
FIG. 5A-5C are plan views of various manufacturing stages in creating a micro-mechanical device with a suspended mass, according to one example of principles described herein.
Figure 5B:
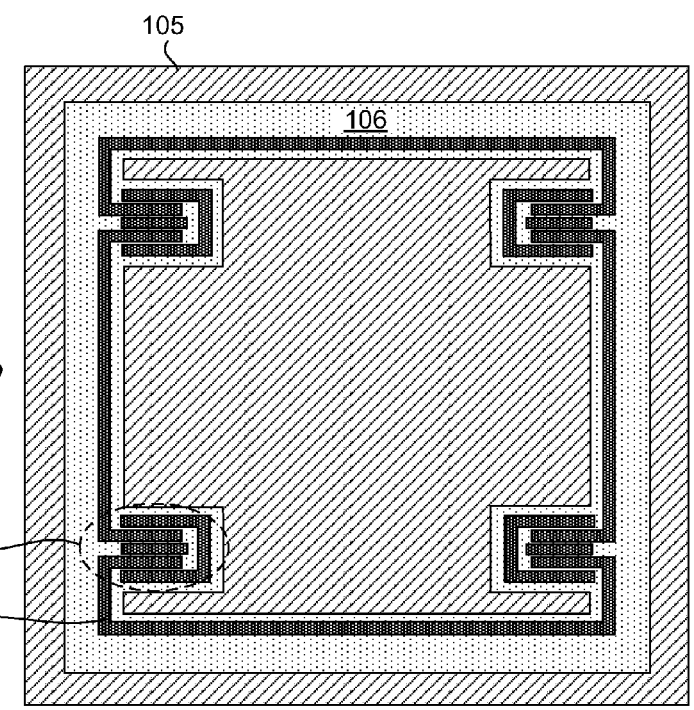
Figure 5C:
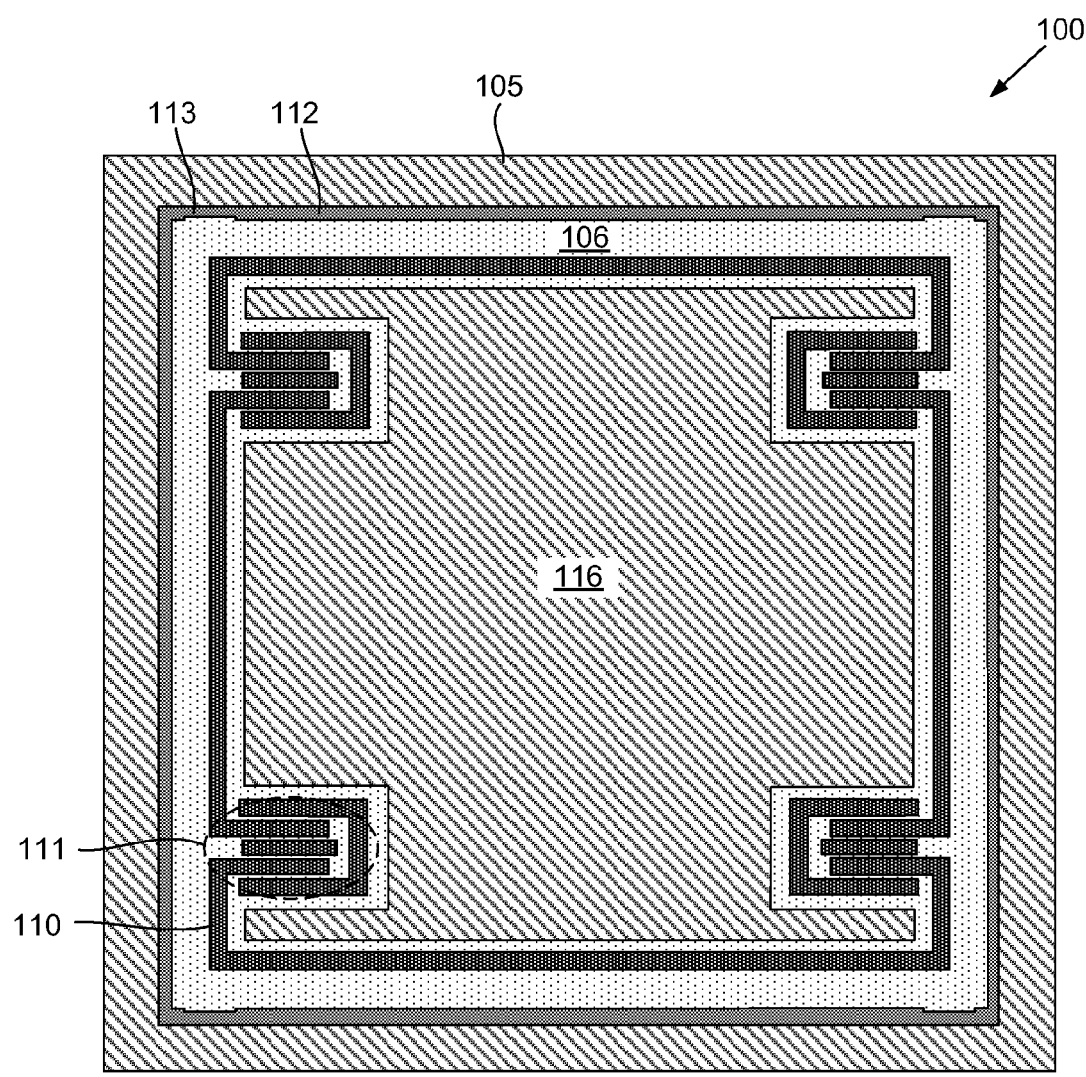

FIG. 5A-5C are plan views of various manufacturing stages in creating micro-mechanical sensor with a suspended mass. The plan views are taken along line A-A in FIG. 2C. Line A-A is on the floor of the internal cavity (106). FIG. 5A shows the substrate (105) and the internal cavity (106). The cross sections of the solid portions of the substrate (105) are shown with diagonal hash lines and the floor of the internal cavity (106) is shown with dotted fill.

FIG. 5B shows the flexure trenches (110) that are used to define the flexures (111). As discussed above, the flexure trenches (110) are formed from the first side (118-2, FIG. 2C) into the cavity (106).

FIG. 5C shows the release trench (112) formed around the perimeter of the cavity (106) to release the suspended mass (116). In some examples, the release trench (112) may also define bumper features (113) that are designed to contact the substrate (105) to limit the motion of the suspended mass (116). This prevents the flexures (111) from being over extended or breaking during high accelerations. As discussed above and shown in FIG. 2C, the release trench (112) is formed in the second side (118-2, FIG. 2C) of the substrate and extends into the cavity (106). In this instance, the release trench (112) is also shown extending slightly into the floor of the cavity (106).

The example shown in FIGS. 5A-5C is for a single axis accelerometer that is designed to sense accelerations in the plane of the substrate. As illustrated in FIG. 5C, the sensing axis is up and down the page. The flexures have a low spring constant in this direction and the bumpers (113) are configured to limit motion in this direction.

The techniques and designs described above illustrate principles for creating suspended mass sensors that are sensitive to low acceleration levels and robust against damage during high accelerations. In general, the micro-mechanical device is includes a substrate with a thickness, an internal cavity, a first surface, and an opposing second surface. A first trench is formed from the first surface of the substrate into the internal cavity. The first trench at least partially defines a flexure. A number of additional trenches may be used to complete the flexure.

A second trench is formed from the second surface of the substrate into the internal cavity and at least partially defines a suspended mass. The second trench may be a release trench and/or may form additional flexures. The suspended mass is connected by the flexure or flexures to the substrate. The flexures are designed to allow preferential motion of the suspended mass in the sensing direction. For example, the flexures may be configured to sense in-plane accelerations (X or Y directions in FIG. 1).

The two trenches are formed so that they cut into the internal cavity in different locations. This lateral separation prevents reactive ions from one etch from directly impacting features etched by the other etching operation. By isolating the flexures formed from a first side from the release etch performed from the second side, the integrity and dimensions of the flexures can be maintained in the finished product.

Additionally, by forming trenches from both sides of the substrate, the thickness of the substrate and suspended mass can be increased. In many examples, the suspended mass has the same thickness as the substrate and may include portions of the first surface of the substrate and a portion of the second surface of the substrate.

In some examples, the flexures are centered with respect to the center of mass of the suspended mass. This reduces the tendency of the mass to twist when subjected to accelerations. These suspended masses can be used in a variety of applications including sensing acceleration, sound, and pressure and as actuators that control light, fluids, and or other material.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A micro-mechanical device comprising:
    a substrate comprising an internal cavity, a first surface, and an opposing second surface;
    a first trench formed through the first surface of the substrate into the internal cavity, the first trench at least partially defining flexures; and
    a second trench formed through the second surface of the substrate into the internal cavity, the second trench at least partially defining a suspended mass, in which the suspended mass is connected by the flexures to the substrate, in which the flexures are sandwiched between sides of the suspended mass and the surrounding substrate;
    in which the second trench is narrower than the first trench such that under acceleration the second trench closes before the first trench and limits motion of the suspended mass.

2. The device of claim 1, in which the flexures are symmetrically disposed about a center of mass of the suspended mass such that the tendency of the suspended mass to twist under acceleration is reduced.

3. The device of claim 1, in which the second trench is a release trench formed around the perimeter of the suspended mass.

4. The device of claim 1, in which the second trench defines additional flexures.

5. The device of claim 1, further comprising bumpers formed by the second trench.

6. The device of claim 1, in which the first trench is formed into a first portion of the internal cavity and the second trench is formed into a different second portion of the internal cavity.

7. The device of claim 1, in which the suspended mass has the same thickness as the substrate and includes a portion of the first surface and a portion of the second surface.

8. The device of claim 1, in which the substrate is a silicon-on-insulator substrate.

9. The device of claim 8, in which the silicon-on-insulator substrate comprises a handle layer, an oxide layer, and a device layer, in which the second trench is a release trench formed in the device layer and the flexures are formed in the handle layer.

10. A method for forming the suspended mass of claim 1, the method comprising:
    obtaining the substrate with an internal cavity;
    etching the first trench through the first surface of the substrate and into a first portion of the cavity, the first trench at least partially defining a first flexure; and
    etching the second trench through the second surface of the substrate and into a second portion of the cavity to at least partially define the suspended mass, in which the first flexure is sandwiched between the suspended mass and surrounding substrate and the suspended mass is suspended from the substrate by the first flexure, in which the suspended mass comprises a portion of the first surface and a portion of the second surface.

11. The method of claim 10, in which obtaining the substrate comprises combining multiple layers to form the substrate, the internal cavity being closed by an adjacent layer prior to etching said trenches.

12. The device of claim 1, in which the second trench defines a second set of flexures.

13. The device of claim 1, in which the flexures are to allow preferential motion of the suspended mass in an in-plane direction.

14. The device of claim 1, in which the flexures comprise a rectangular cross section with the major axis of the rectangular cross section being perpendicular to the first and second surfaces.

15. The device of claim 1, in which the internal cavity is closer to one of the surfaces than the other.

* * * * *